May 29, 1945.  S. H. EVANS  2,376,993
PHOTOGRAPHIC CAMERA
Filed Sept. 28, 1942

INVENTOR.
SIDNEY H. EVANS.
BY
ATTORNEY.

Patented May 29, 1945

2,376,993

UNITED STATES PATENT OFFICE 2,376,993

PHOTOGRAPHIC CAMERA

Sidney H. Evans, Berkeley, Calif.

Application September 28, 1942, Serial No. 459,902

8 Claims. (Cl. 95—50)

This invention relates to photographic cameras of the so-called "view camera" type, generally used on tripods, and in which means is provided whereby the angular relation between the plane of the plate or film holder and the plane of the lens board or mounting may be adjusted to any desired position to meet various focal requirements of the view or other object being photographed.

The invention has for its principal object improvements in the front and rear end and bellows construction in relation to one another whereby the various required relative adjustment of these parts may be more simply and effectively secured.

Briefly stated the invention comprises improved construction in such cameras whereby double swing back and front, as well as revolving back, together with rising, falling and laterally shifting front movement may be obtained in a simpler way than heretofore and in a manner adapted for use with a rigid "bellows" or telescopic but otherwise substantially rigid sheet metal bellows, and which type of bellows cannot be used with the known types of double swing view cameras as lateral flexibility of the bellows is necessary to permit swing movements of either front or back end of the camera.

Other features and advantages of my improved camera construction will appear in the following description and accompanying drawing.

Figure 1:
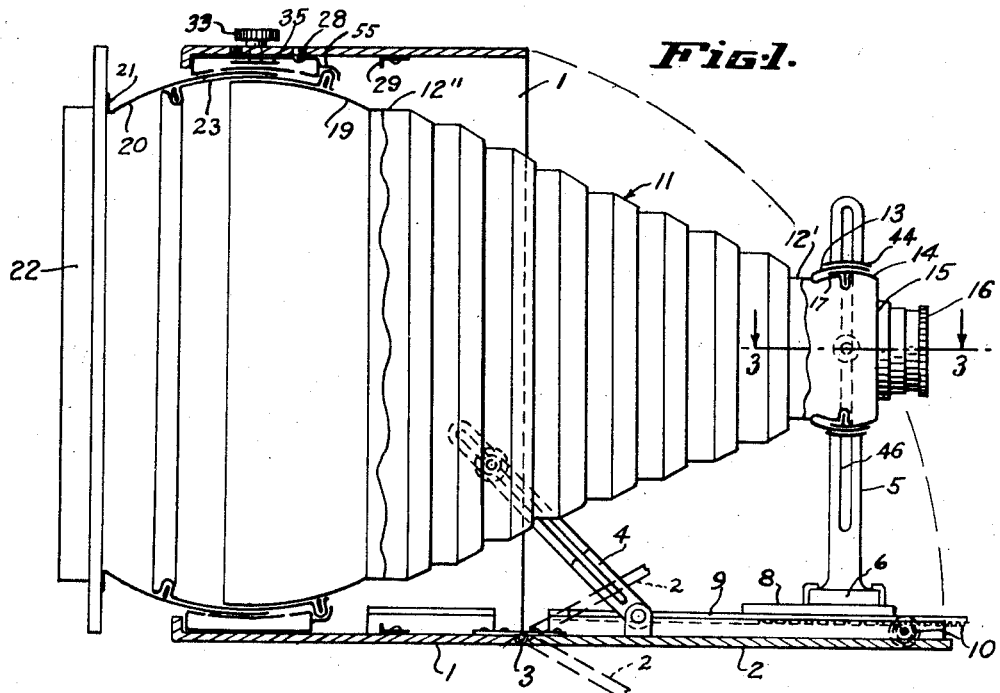
Fig. 1 is a longitudinal vertical section of a camera incorporating my improvements.

Before describing the drawing in detail, and to make their understanding easier, the improvements are here shown on a folding box type of view camera, and may be said to comprise the provision of a large thin sheet metal (or plastic) ball and socket connection between the plateholder receiving end of the camera and the rear end of the bellows, and a similar tho smaller sheet metal ball and socket connection between the front end of the bellows and the lens mount, so that the rear end may be "swung" in any direction as well as bodily revolved on the adjacent ball and socket joint connection and the lens may similarly be tilted vertically up or down, as well as sideways to any desired angle. The usual provisions are also made for the front or lens carrying portion to be bodily raised or lowered or shifted sidewise, while during every movement above described the bellows being preferably of rigid sheet metal (or black plastic) construction will remain fully open (in cross section) without the requirement of being bent in or distorted as required of the ordinary bellows when such relative tilting and twisting adjustments of the rear and front ends of a bellows type camera are made.

In further detail the drawing shows under the various numeral designations the following parts:

The main body of the camera or square box 1, provided with the usual front lid or opening panel 2, suitably hinged at 3 to the body and held in level extension or any desired angular up or down extension (as per dotted position) by suitable braces 4, and provided with a suitable latch (not shown) for holding the lid closed, all as well known in common folding box type of camera construction.

Also included are other common and well known features of such cameras such as a pair of front, laterally spaced standards or uprights 5 to support the lens, and which are joined at the lower or both ends as at 6 and mounted as at 7 to slide transversely on a carriage 8 to be locked in any position of sliding by any suitable clamp not shown as being well understood in the art, and which carriage 8 is suitably mounted in guides 9 on the panel and box to slide from closed position within the box to outer position on the guides 9 to be secured thereto at any point by suitable latching means not shown as well understood in the art, and which guides are themselves slidably mounted on the upper surface of the panel and preferably manually adjustable longitudinally by suitable rack and pinon mechanism 10 all as common and well known in the art.

The novel features of construction as stated relate to the ball and socket rear and front ends and special rigid bellows. The bellows is generally designated 11 and comprises a plurality of (preferably sheet metal) sections 12 telescopically fitting one within the other so as to be collapsible within the camera box and with the extreme forward and smallest section 12' formed with a spherical portion 13 which frictionally embraces a spherically formed sheet metal ring portion 14 extending rearwardly from a flat plate or "lens board" 15 to which the camera lens 16 is mounted. To make the thus formed ball and socket connection light tight, outer shell 13 is preferably formed with an inner recurrent spherical flange 17 which frictionally embraces the inner surface of ring 14, thus permitting the lens mounted on "board" or flange 15 to be moved in any angular relation to the front end of the bellows (or revolving) without twisting or bending the bellows.

Figure 3:
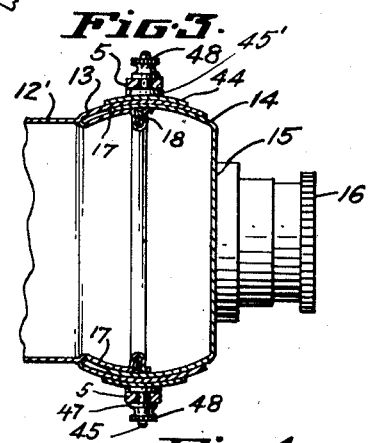
Fig. 3 is an enlarged portion of Fig. 1 showing the detailed construction of the front part of the camera, as seen from the line 3—3 of Fig. 1.

The friction of the ball joint may be such as to snugly hold the lens in any desired position without clamping it, tho a clamp may be provided as later described for the rear end ball joint if desired. The sheet metal or plastic of which the ball joint is made will of course be optically blackened in the well known way as with lens mounts, but to further insure against the entrance of light through the joint, one or more velvet or other soft packing rings 18 may be provided, as shown in Fig. 3.

The outer spherical shell 13 is provided with any suitable means for securing it to and between the standards 5 and yet provide for adjustably supporting it at any point of elevation or sidewise shifting with frame 6, 7. Such means is indicated in Figs. 1 and 3 as a central spherical band 44 frictionally embracing outer spherical member 13 and provided at opposite central points with rigidly projecting threaded stems 45, having hubs or bases 45' soldered or otherwise firmly secured to band 44, and the stems each extending through slot 46 in the standards 5 and with a loose washer 47 and thumb nut 48 screwed on its outer end.

The rear ball joint is formed by a spherical ring 19 extending rearwardly from the largest or last section 12" of the bellows which is nominally outwardly frictionally embraced by a similar spherical ring 20 to form the joint and which latter ring is flanged as at 21 and secured to the extreme rear end frame of the camera 22 which is adapted to receive the ground glass, and a plate or film holder of any kind in the well known way not shown as being well understood and forming no part of the present invention.

Figure 2:
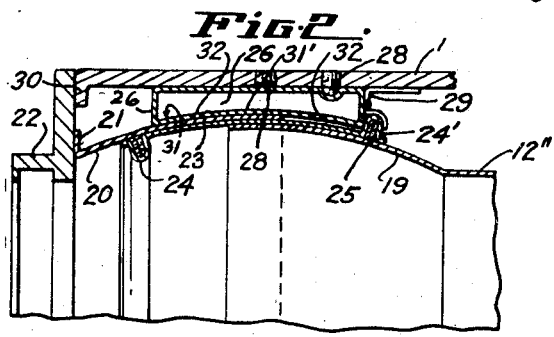
Fig. 2 is an enlarged portion of Fig. 1 showing the detailed construction of the rear part of the camera.

However, while outer ball shell 20 of the rear ball joint nominally embraces inner ball shell 19, I preferably interpose a third ball shall ring 23 which functions to straddle both inner margins of rings 19 to 20 to thus permit greater relative movement of these two and making a better light seal, particularly as intermediate ring 23 may be formed along opposite edges with reverse beads 24, 24' each embracing a doubled over strip of black velvet 25 or other soft material arranged to bear upon the adjacent ball ring, as shown in Fig. 2.

These beads 24, 24' also form limit stops respectively to the relative tilting movement of rings 20 and 19, and bead 24' also holds the ball joint centralized within an outwardly rectangular carrier frame 26 which is inwardly spherically formed to frictionally embrace ring 20 and which frame is slidably positioned within the square box body 1 of the camera so as to slide from the rearward position shown in Fig. 1 with ground glass frame 22 spaced rearwardly from box 1, to a forward position with frame 22 touching the rear end of box 1, and as shown in Fig. 2, held in either position as by suitable spring detent buttons indicated at 28 in Fig. 2, or any other desired latching means.

Slidable frame 26 is stopped at its forward and rearward position as by stops 29 and 30, and the frame is preferably of hollow sheet metal or plastic construction with its outer fit rectangular walls a nice sliding fit within box 1, and the inner spherical wall 31 is circumferentially cut at 32 for about three quarters of its diameter to form a central brake band strip 31' for clamping the rear ball ring 20 immovable at any point of tilting or revolving of the ground glass frame.

Figure 5:
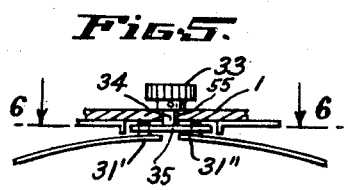
Fig. 5 is an enlarged fragmentary sectional elevation showing the rear joint brake band operating device.
Figure 6:
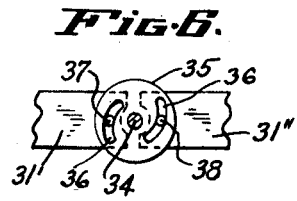
Fig. 6 is a plan view of the device of Fig. 5 as seen from the line 6—6 of Fig. 5.

In order to operate the brake band strip 31', it is divided to provide two free ends 31', 31" which (see Figs. 5 and 6) may be drawn toward one another and locked tightly gripping ring 20, by means of thumbknob 33 accessible at the top of the camera box 1. This knob 33 is secured to an axle 34 which projects through a slot 55 in the upper wall of the box and carries at its inner end a cam disk 35 provided with two cam slots 36 engaging pins 37, 38 secured to and projecting upward from the brake band ends respectively, so that a one way turn of the knob tightens and locks the band, and the opposite turn releases it so that the ball joint is again free to swivel. The slot 55 permits the axle of the operating knob to slide back and forth with the sliding of carrier frame 26.

Figure 4:
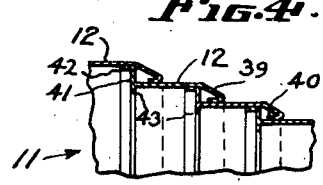
Fig. 4 is an enlarged portion of Fig. 1 showing the detailed construction of the bellows.

The construction of the sliding bellows joints may be similar to that used in an ordinary telescope except that a more pronounced conical effect is desired and means should be provided within to prevent light being reflected to the sensitive surface from the bellows walls, the features shown best in Fig. 4 have been developed to meet the requirement of this camera, and in which figure the sections 12 comprise a series of square frames of successively diminishing size, each with a slanted nose portion 39 with a recurrent edge 40 slidably engaging the next smaller frame 12, while the inner end of each frame extends outwardly as at 41 with a flange 42 slidably bearing against the inner surface of the next larger frame. Also each portion 41 is extended inwardly of the bellows as at 43 to form a guard against reflected light.

By the construction above set out, the use of a rigid telescopic bellows made of metal or other hard material becomes possible and yet provides through the use of the two hollow ball joints every possible angular relation of either front or back end of the camera as well as complete revolving of the back to take horizontal or vertical pictures if standard elongated plate holder or film holders be used. Such an all metal construction in a bellows type of camera is very important in some hot humid climates where the ordinary bellows speedily goes to pieces, and the use of the ball joints reduces all angular adjustments as well as revolving the back, to matters of utmost simplicity. The back end is only pulled out when desiring to use the swing back, as the revolving feature operates equally well when the rear end is pushed forward to closed position.

In regard to assembling the various spherical shells, the inner ones may of course be of one piece, and the outer ones may be expanded and shrunk into place, or they may be parted or split in either plane and united after assembling, or the several shells may be simultaneously compressed or spun over one another to spherical form, or put together in any other desired manner.

It will of course be evident that the usual tripod socket or its equivalent is provided on the camera and that the usual accessories such as view finder, levels, etc. may also be provided, as they are not concerned with the present invention.

I claim:

1. In a photographic camera having a front lens carrying end and a plate or film carrying rear end, a hollow ball joint mounting said lens carrying end providing universal movement for the lens, and through which hollow ball joint the light image is projected from the lens to the rear end of the camera, and a hollow ball joint mounting said rear end of the camera and through which the light image passes to the plate or film, and a bellows connected at opposite ends respectively with one member of each hollow ball joint said bellows being of telescopic but otherwise substantially rigid sections.

2. In a photographic camera having a front lens carrying end and a plate or film carrying rear end, a hollow ball joint mounting said lens carrying end providing universal movement for the lens, and through which hollow ball joint the light image is projected from the lens to the rear end of the camera, and a hollow ball joint mounting said rear end of the camera and through which the light image passes to the plate or film, and a bellows connected at opposite ends respectively with one member of each hollow ball joint, said bellows being of telescopic sheet metal construction so as to substantially form a rigid tube when extended.

3. In a photographic camera having a front lens carrying end and a plate or film carrying rear end, a hollow ball joint mounting said lens carrying end providing universal movement for the lens, and through which hollow ball joint the light image is projected from the lens to the rear end of the camera, and a hollow ball joint mounting said rear end of the camera and through which the light image passes to the plate or film, and a bellows connected at opposite ends respectively with one member of each hollow ball joint, said camera provided with a box-like body, a carrier frame within the body slidable axially of the camera, and means supporting the rear ball joint in said carrier frame for bodily movement therewith.

4. In a photographic camera having a front lens carrying end and a plate or film carrying rear end, a hollow ball joint mounting said lens carrying end providing universal movement for the lens, and through which hollow ball joint the light image is projected from the lens to the rear end of the camera, and a hollow ball joint mounting said rear end of the camera and through which the light image passes to the plate or film, and a bellows connected at opposite ends respectively with one member of each hollow ball joint, said camera provided with a box-like body, a carrier frame within the body slidable axially of the camera, and means supporting the rear ball joint in said carrier frame for bodily movement therewith, and manually operated means carried by said carrier frame for holding said ball joint at any angular point of adjustment.

5. In a photographic camera having a front lens carrying end and a plate or film carrying rear end, a hollow ball joint mounting said rear end providing universal tilting movement therefor, and through which hollow ball joint the lens formed image is projected to the plate or film, said hollow ball joint comprising inner and outer overlapping spherical rings of stiff material and an intermediate spherical ring of stiff material all in frictional operative embracing relation.

6. In a photographic camera having a front lens carrying end and a plate or film carrying rear end, a hollow ball joint mounting said rear end providing universal tilting movement therefor, and through which hollow ball joint the lens formed image is projected to the plate or film, said hollow ball joint comprising inner and outer overlapping spherical rings of stiff material and an intermediate spherical ring of stiff material all in frictional operative embracing relation, and a supporting frame for the ball joint formed interiorly with a spherical seat frictionally embracing the exterior of the joint.

7. In a photographic camera having a front lens carrying end and a plate or film carrying rear end, a hollow ball joint mounting said lens carrying end providing universal movement for the lens, and through which hollow ball joint the light image is projected from the lens to the rear end of the camera, and a hollow ball joint mounting said rear end of the camera and through which the light image passes to the plate or film, and a bellows connected at opposite ends respectively with one member of each hollow ball joint said bellows being of telescopic but otherwise substantially rigid sections, the bellows sections being successively smaller size rectangular frames spaced inwardly from one another, and each formed at its forward end with an inwardly extending wall having a flange slidably engaging the next smaller frame, and at its rearward end with an outwardly projecting wall having a flange slidably engaging the next larger frame.

8. In a photographic camera having a front lens carrying end and a plate or film holder carrying rear end, a hollow ball joint mounting said rear end arranged to provide universal tilting movement as well as bodily rotary movement therefor, and through which hollow ball joint the lens formed image is projected to the plate or film, and manually operated means accessible at a point forward of the plate or film holder for clamping said ball joint at any desired point of angular tilting, and/or bodily rotation of said plate or film holder in a plane transverse to the axis of the camera.

SIDNEY H. EVANS.